(12) United States Patent
Santoli et al.

(10) Patent No.: US 7,646,935 B2
(45) Date of Patent: Jan. 12, 2010

(54) METHOD AND COMPUTER PROGRAM PRODUCT FOR AUTOMATIC IMAGE MIRRORING

(75) Inventors: Giulio Santoli, Rome (IT); Fabio Barillari, Priolo G. 5 (Siracusa) (IT)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 11/290,742

(22) Filed: Nov. 30, 2005

(65) Prior Publication Data
US 2006/0132500 A1   Jun. 22, 2006

(30) Foreign Application Priority Data
Dec. 21, 2004   (EP) .................................. 04300931

(51) Int. Cl.
*G06K 9/32* (2006.01)

(52) U.S. Cl. ....................................................... 382/293

(58) Field of Classification Search ................. 345/645; 382/293; 700/194, 251; 704/8
See application file for complete search history.

(56) References Cited

U.S. PATENT DOCUMENTS

| 2003/0110234 A1* | 6/2003 | Egli et al. .................... 709/217 |
| 2004/0225967 A1* | 11/2004 | Hassanin et al. ............. 715/760 |
| 2005/0182792 A1* | 8/2005 | Israel et al. .............. 707/104.1 |

* cited by examiner

*Primary Examiner*—Matthew C Bella
*Assistant Examiner*—Gregory F Cunningham
(74) *Attorney, Agent, or Firm*—Steven E. Bach

(57) ABSTRACT

Method and computer program product for mirroring an image according to internationalization information in an application supporting images. An initial image to be mirrored, which is described in a graphical format, is read. The image data is wrapped in a new image format by adding information about which area of the image is to be mirrored and how it is to be mirrored. A new image format library added to the application enables the application to read the new image format and transform the image according to the locale.

14 Claims, 4 Drawing Sheets

METHOD AND COMPUTER PROGRAM PRODUCT FOR AUTOMATIC IMAGE MIRRORING

FIELD OF THE INVENTION

The present invention generally relates to application programs supporting bi-directional language transformation, and more particularly to graphical user interfaces supporting bi-directional image transformation.

BACKGROUND

Application programs supporting language translation must be able to transform a text readable from left to right in English, for instance, into a text readable from right to left in Arabic, Hindi, or Hebrew. Existing application program supporting bi-directional languages do this in an automatic way: the program is able to receive inputs from the user and to show output according to the direction of the language. In graphical user interfaces, not only text but also layouts and images must be transformed from right-to-left to left-to-right and the opposite, from right-to-left to left-to-right.

In graphical user interface applications supporting bi-directional languages today, the text and layout are displayed automatically in the desired direction on the basis of a unique resource bundle containing translated text. A resource bundle is the portion of a piece of software that holds application data, but not user data, separate from the program itself. Typical resources include icons, window positions, dialog box definitions, program text, and menus. The application makes a transformation on the text and layout elements from this bundle according to the language used.

However, prior art methods to internationalize GUIs do not provide an automatic solution for images today. A typical solution is described in Chapter 9 of the book "Java Internationalization" by Andy Deitsch and David Czarnecki, edited by O'Reilly in March 2001. Their solution is to provide different images in the resource bundle, one for each locale supported by the application. A locale is a set of user preference information related to the user's linguistic, environmental, and cultural conventions. Furthermore, the code of the application must include logic to load the right image according to the language used. The drawback of this unautomated solution is doubling of program storage and library for image space and higher code complexity.

One particular difficulty with image mirroring is the fact that depending on the meaning of an image, it may need to be mirrored, or not. For instance, the image of a joystick may need to be reversed if the direction of the language changes, whereas a road label with 'STOP' inside has no need to be mirrored. A solution is proposed in the 'Mirroring Awarness' document posted as web pages on January 2003 on the Microsoft (Microsoft is a trademark of Microsoft Corporation in certain countries) web site at the http://www address: microsoft.com/globaldev/getwr/steps/WRG_mirror.mspx.

The method proposed here for a developer of a pure Windows (Windows is a trademark of Microsoft Corporation in certain countries) application is to mirror the application automatically. Every graphical object will be mirrored, images and icons included. In this case, a problem arises in that some images, as mentioned above, should not be mirrored, depending on their meanings. The Microsoft pages suggest adding extra logic within the code to disable the automatic mirroring temporarily in such cases. This is performed by calling some specific disabling mirroring Windows instructions. Conversely, the developer can disable or not enable the automatic mirroring. In this case no image will be automatically mirrored, and some explicit instructions in the code are needed to enable the mirroring. In Web applications, the Microsoft document suggests setting a flag equal to RTL (Right To Left). Nevertheless, in this case the images will not be mirrored automatically, as the developer has to apply the transformation explicitly by calling a cascading style sheet filter (script language like) that will transform the image. This mirroring solution is not automatic as the application code or Web pages have to be modified to introduce a logic for enabling or not enabling mirroring.

Consequently, there is a need for a way to mirror images in application programs which does not requiring logic in the application code itself to enable or disable.

SUMMARY

Aspects of the invention include a method operating on a computer for mirroring an image according to internationalization information in an application supporting internationalization and images. The method includes reading the initial image to be mirrored described in a graphical format; creating metadata comprising the initial image data in the graphical format and adding, for each area in which the image is split, information specifying whether it is to be mirrored or not; reading from the GUI the metadata and the internationalization information; and performing, by the GUI, the mirroring of the image as specified by the internationalization information by applying this information to all the areas of the image specified to be mirrored.

The graphical format of the initial image may be, for example, GIF, TIFF, or JPG. The application software may use the metadata to automatically adapt the images to be displayed by the operating system according to the language used (operating system locale). The present invention applies to any programming language environment, and is suitable for simplifying Web site application support for many languages.

Additional information may be added to the metadata in order to include, for instance, more options than the bi-directional information, and for other purposes. For example, a parental control can be added; the program can check the user and decide whether or not to display the image.

With the present invention, the application logic is independent from the images. Indeed, the application logic does not need to be modified when, for example, a mirrorable image is substituted for a non-mirrorable image.

BRIEF DESCRIPTION OF THE DRAWINGS

The present invention will be best understood by reading the following detailed description together with the drawings, wherein.

DETAILED DESCRIPTION

In a preferred embodiment, the invention may be implemented in the XML programming language. However, the invention is not so limited, and many other programming languages can be extended to support the new image format according to the invention.

Figure 1:
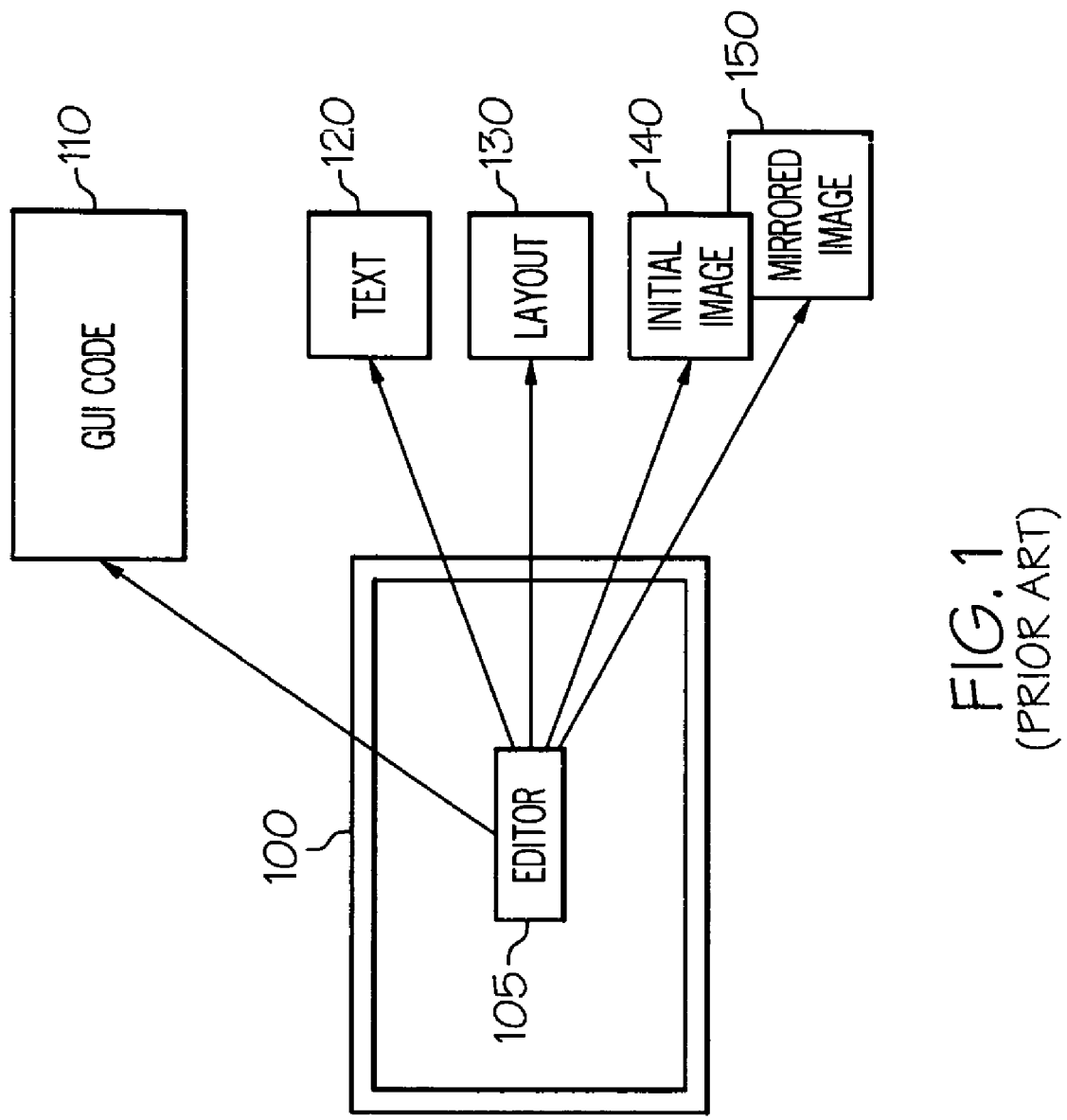
FIG. 1 illustrates components of a computing environment suitable for executing a method according to the prior art for image mirroring.

FIG. 1 illustrates components of a computing environment suitable for executing a method according to the prior art for image mirroring. Here, a developer uses an editor (105) on a workstation (100) to create GUI code (110), initial text (120), and layout elements (130). For text and layout, at execution of the GUI, the GUI reads the locale of the language to be used in the system, transforms the text and layout elements into a different direction according to the locale of the operating system on which it is operating, and displays the text and layout elements read from the text and layout bundles (120, 130). In some cases, the developer may create a mirrored image (150) for an initial image (140) using the editor, which is included in the image bundle. In other cases, there is no need to create a mirrored image, as the GUI uses a system service to generate a mirrored image if necessary. However, in both cases, the developer adds instructions in the GUI code through the editor (105) to introduce, each time an image is to be displayed, logic for deciding whether the initial image or a mirrored image will be used, depending on the meaning of the image.

Figure 2:
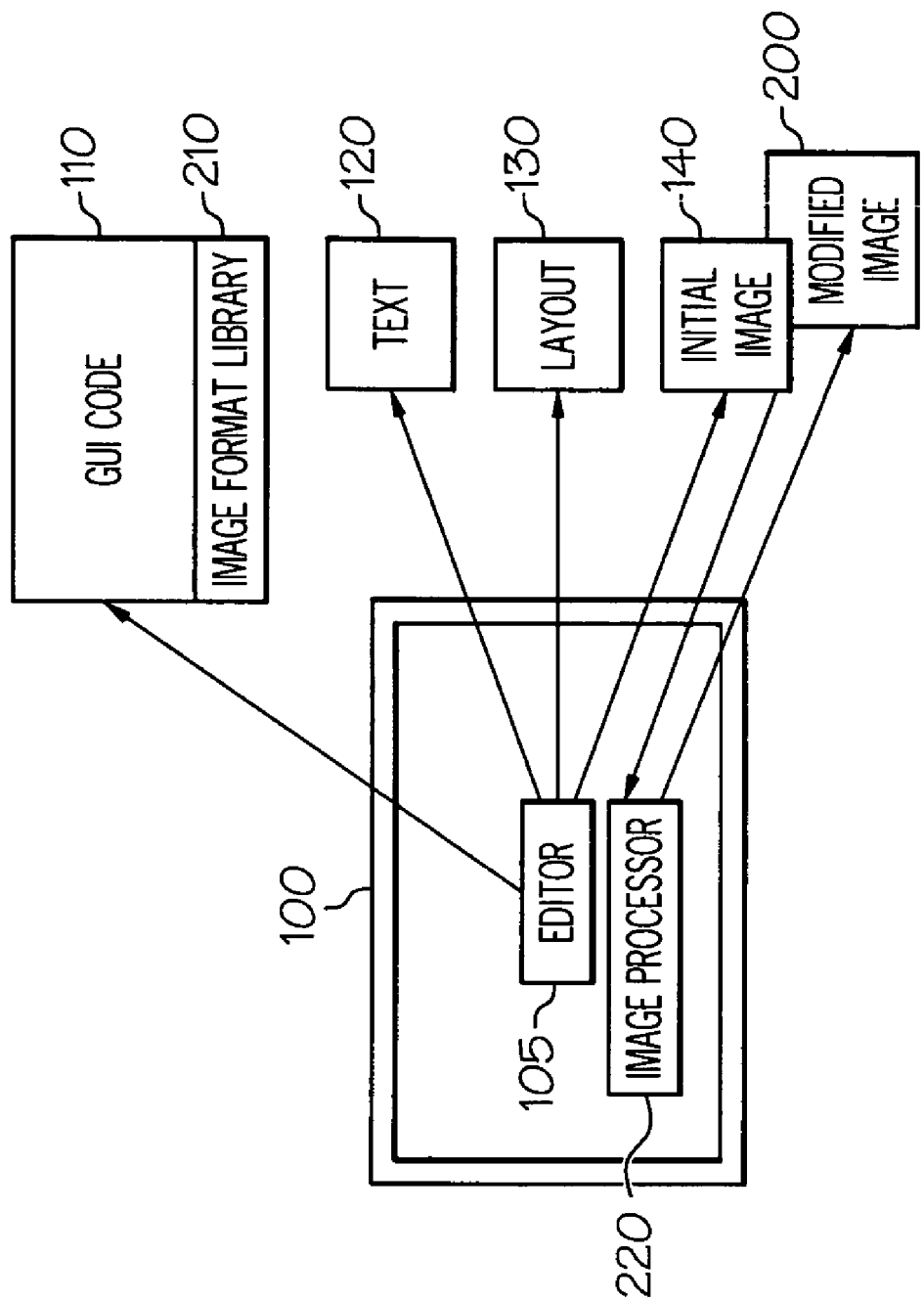
FIG. 2 illustrates components of a computing environment suitable for image mirroring according to the invention.

FIG. 2 illustrates components of a computing environment suitable for image mirroring according to the invention. The GUI developer proceeds in the way just described for text and layout mirroring. The initial image elements (140) are created in the same way through the editor (105). The developer modifies the initial image element into a modified image having a new image format (200) by using a new image processor (220). The new image format is directly usable by the GUI which displays the image with the new format according to the locale of the system on which it is operating. The GUI code is not modified by the developer. At execution of the GUI, before displaying any images, according to the locale of the system on which the GUI operates, the GUI uses a new library (210) enabling it to read the modified images (200) and to perform the transformation.

Figure 3:
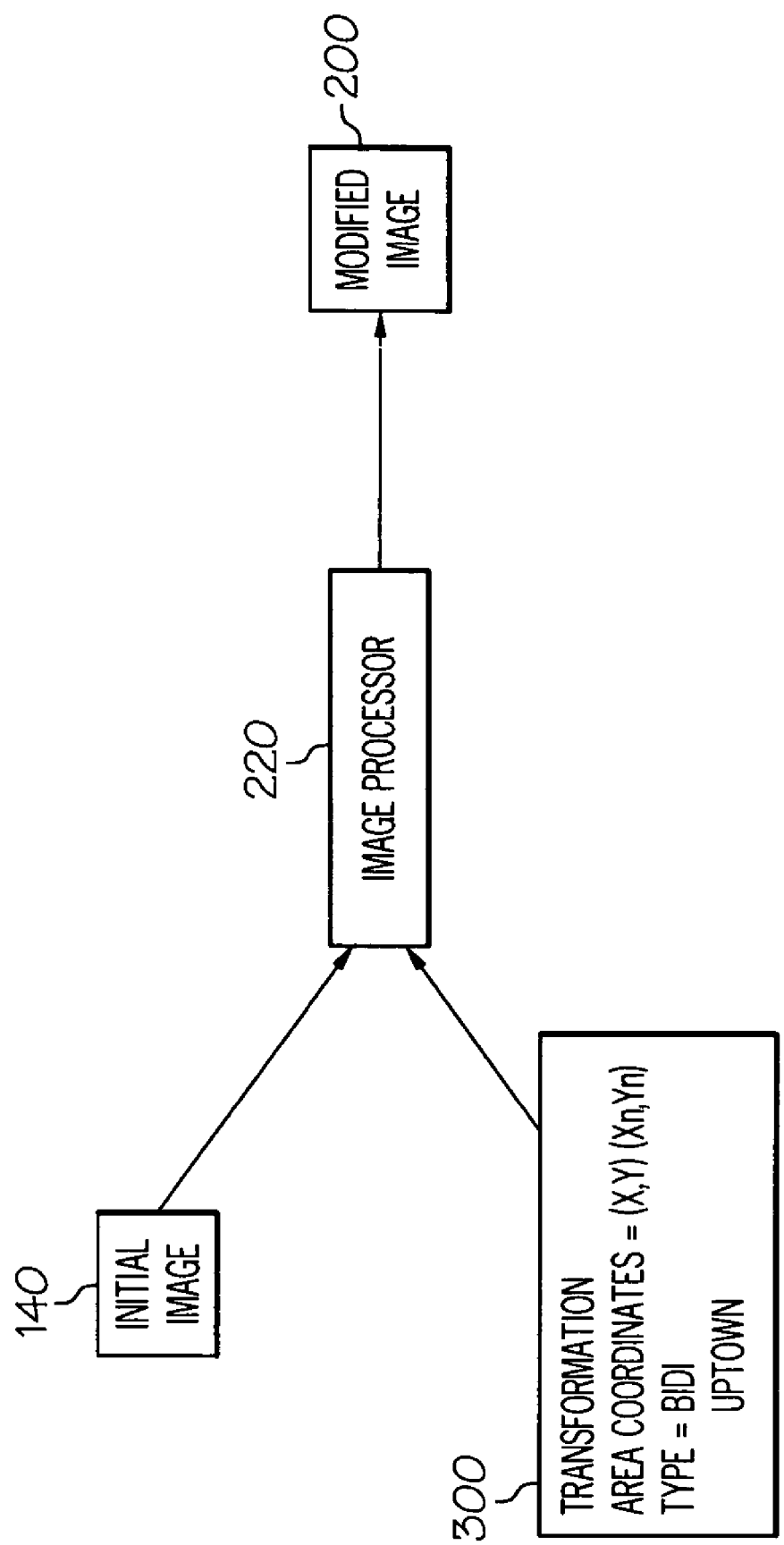
FIG. 3 is a logical representation of an inventive image processor.

FIG. 3 shows a representation of the new image processor (220) according to the invention. The input to this image processor (220) is an initial image (140), which may be described in TIFF, GIF, JPG, or any other suitable format. The image processor (220) interprets the user input settings and generates a new file that contains the initial image (140) plus the transformation declarations for the whole image or parts of the image.

An example of a command for a transformation (300) of an image is given in FIG. 3. The command specifies whether an image is to be transformed, and if so, how. In a preferred embodiment, more than one choice may be proposed. The type of transformation is entered in the command field with a 'TYPE' parameter which can be, for example, either 'BIDI' for bi-directional, which means that the image is to be reversed left-to-right into right-to-left, or 'UPDOWN' which means that the image is to be reversed up-to-down into down-to-up. Also, in a preferred embodiment, it may be indicated that the transformation applies only to selected parts of the image defined by their coordinates. This is the object of the 'Area Coordinates' parameters (X,Y) which designate the coordinates of the image parts on the screen to be changed.

The output of the processor may be an extended graphical format, which is a wrapper of the format of the initial image read in input. A set of metadata information may be added to the initial format, which comprises, in a preferred embodiment, the bidirectional enablement and the data format type. XML may be the base, with a minimum set of tags (is bidi, bidi sub area, data type). The following is an example of the data format.

```
<image>
    <transformation type="rtl" area="3,3,15,15" order="1" />
    <transformation type="updown" area="15,4,45,30" order="2" />
    <data format="gif">
        <![CDATA[GIF89a Ł ŁÄṄ.........]]>
    </data>
</image>
```

Above, the wrapping of the image data is shown in bold type; the image data is the only part not in bold.

In the above XML example, transformation type indicates the type of the transformation (ltr for left to right, rtl for right to left, updown for up to down, downup for down to up), transformation area indicates the coordinates of the area where to apply the transformation, transformation order indicates the transformation ordering, and dataformat indicates the image format.

The image processor (220) reads the image in the input, the command for the image in the new format, and generates the '.newformat' new format. The program executed by the image processor may be written in any suitable programming language.

Any application such as a GUI supporting internationalization can read the '.newformat' format and apply the mirroring when the locale requires an orientation different from the original image orientation. In the above example, the image will not be mirrored if the application is running in a left-to-right operating environment, and the area (3,3,15,15) of the image will be mirrored if the application is running in a right-to-left operating environment.

Figure 4:
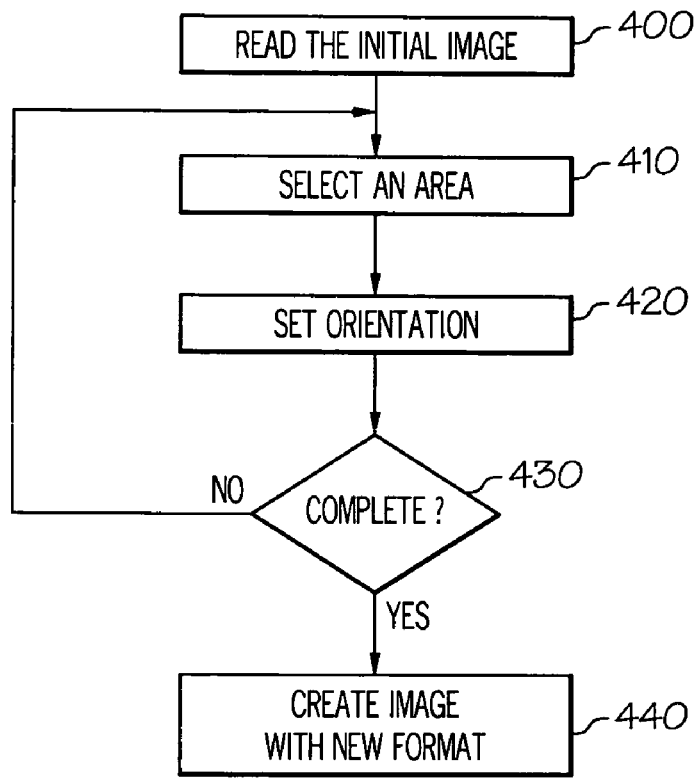
FIG. 4 shows a flowchart illustrating the creation an image having a new format according to the invention.

FIG. 4 is flowchart showing aspects of the creation of an image having a new format according to the invention. This flowchart may be implemented in the new image processor program (220) for wrapping an existing graphical image format (140) understandable by the GUI and creating a new format (200) of the image which will be understandable by the GUI enriched with a new image format library (210). The new format of the image will contain information describing how the user wants the image to be mirrored.

The processor program gets the initial image (400) through a user interface as input. In a preferred embodiment, the user interface of the image processor is graphical, so the image is displayed. In a simpler embodiment of the invention, the image processor accepts only command line input, and only the name of the image is received by the processor program. The user specifies which area of the image is to be mirrored (410). If a graphical user interface is used, the area is defined graphically on the screen, or the names of the areas are specified. The user specifies (420) which kind of transformation is required for the image or image areas coded as LTR (left-to-right), RTL (right-to-left), UD (up-to-down) or DU (down-to-up). Splitting the image into areas is an option of the method of a preferred embodiment, the default being getting mirroring information for the entire image if no splitting is specified. The user repeats the specifying (420) if all the areas are not processed (answer No to test 430), when the transformation is specified for the entire image (answer No to test 430). The new format '.newformat' is created (440) which contains the initial image data and the parameter values describing the information to mirror the image if needed during the execution of the GUI.

Figure 5:
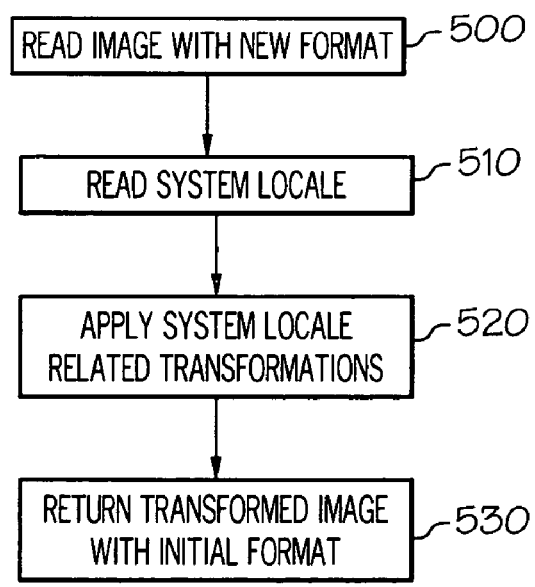
FIG. 5 shows a flowchart illustrating the use by the GUI of the image created with a new format to return a transformed image according to the invention.

FIG. 5 is a flowchart that shows aspects of the use by the GUI of the image created with a new format to return a transformed image, according to the invention. The GUI reads (500) the new image format ('.newformat' file) by calling the image format library (210). The locale information is read (510). As with the other GUI applications, the locale information is provided in the operating system of the workstation on which the GUI operates. Another possibility is for the user to enter locale information which overrides the locale of the operating system. The GUI, as is usual for GUI applications, calls its transformation function to read the locale and further perform the transformations required. For layout transformation and text transformation, the GUI uses different libraries, whereas for image mirroring, the transformation function uses the new image format library (210).

The transformation function of the GUI uses the inputs to apply (520) the transformation as specified by the locale information. If the locale information specifies right-to-left language, the transformation function will apply the left-to-right transformation to all the transformation areas declared as 'RTL' in the image input. The transformation function of the GUI computes the new image data in the initial format (for example, in GIF or JPG) which includes the mirroring of the concerned areas. The new image data is returned (530) to the GUI by the transformation function.

We claim:

1. A method operating on a computer for mirroring an image according to internationalization information in an application supporting internationalization and images, the computer having a GUI, said method comprising:
   reading an initial image, described in a graphical format, to be mirrored;
   creating metadata comprising initial image data of the initial image and adding, for each area in which the image is split, information specifying whether the area is to be mirrored;
   reading the metadata and internationalization information from the GUI; and
   performing, by the GUI, mirroring of the image according to the internationalization information by applying the internationalization information to areas specified to be mirrored.

2. The method of claim 1, wherein creating metadata further comprises specifying, for each area to be mirrored, which type of transformation is required, and wherein applying the internationalization information to areas specified to be mirrored further comprises reading which type of transformation is required, and taking into account the type of transformation required for the area.

3. The method of claim 1, wherein the graphical format of the initial image is one of: GIF, TIFF, and JPG.

4. The method of claim 1, wherein the type of transformation is one of: right-to-left, left-to-right, up-to-down, and down-to-up.

5. The method of claim 1, wherein creating metadata further comprises adding information other than image mirroring information, and wherein said method further comprises reading the other information by the GUI to perform at least one function different from mirroring, in accordance with the other information.

6. The method of claim 5, wherein adding other information comprises adding a parental authorization for displaying an image, and wherein said method further comprises controlling display of the image in accord with the parental notification.

7. The method of claim 1, wherein reading internationalization information comprises reading locale information concerning an operating system of the computer.

8. The method of claim 1, wherein reading internationalization information comprises reading locale information entered by a user.

9. A computer program product for mirroring an image according to internationalization information in an application supporting internationalization and images, the computer program product comprising a computer readable medium having computer readable program code embedded therein, the computer readable program code comprising:
   computer readable program code configured to read an initial image, described in a graphical format, to be mirrored;
   computer readable program code configured to create metadata comprising initial image data of the initial image and adding, for each area in which the image is split, information specifying whether the area is to be mirrored;
   computer readable program code configured to read the metadata and internationalization information from a GUI of a computer; and
   computer readable program code configured to perform, by the GUI, mirroring of the image according to the internationalization information by applying the internationalization information to areas specified to be mirrored.

10. The computer program product of claim 9, wherein the computer readable program code configured to create metadata further comprises computer readable program code configured to specify, for each area to be mirrored, which type a transformation is required, and wherein the computer readable program code configured to apply the internationalization information to areas specified to be mirrored further comprises computer readable program code configured to read which type of transaction is required, and to take into account the type of transformation required for the area.

11. The computer program product of claim 9, wherein the computer readable program code configured to create metadata further comprises computer readable program code configured to add information other than image mirroring information, and wherein said computer program product further comprises computer readable program code configured to read the other information by the GUI and to perform at least one function different from mirroring, in accordance with the other information.

12. The computer program product of claim 11, wherein the computer readable program code configured to add other information comprises computer readable program code configured to add a parental authorization for displaying an image, and wherein said computer program product further comprises computer readable program code configured to control display of the image in accord with the parental notification.

13. The computer program product of claim 9, wherein the computer readable program code configured to read internationalization information comprises computer readable program code configured to read locale information concerning an operating system of the computer.

14. The computer program product of claim 9, wherein the computer readable program code configured to read internationalization information comprises computer readable program code configured to read locale information entered by a user.

* * * * *

UNITED STATES PATENT AND TRADEMARK OFFICE
CERTIFICATE OF CORRECTION

PATENT NO. : 7,646,935 B2
APPLICATION NO. : 11/290742
DATED : January 12, 2010
INVENTOR(S) : Santoli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Sixteenth Day of November, 2010

David J. Kappos
*Director of the United States Patent and Trademark Office*